US010944808B2

(12) United States Patent
Bedi et al.

(10) Patent No.: US 10,944,808 B2
(45) Date of Patent: Mar. 9, 2021

(54) SERVER-SIDE REPRODUCTION OF CLIENT-SIDE QUALITY-OF-EXPERIENCE

(71) Applicant: Verizon Digital Media Services Inc., Dulles, VA (US)

(72) Inventors: Harkeerat Singh Bedi, Los Angeles, CA (US); Satheesh Ravi, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 240 days.

(21) Appl. No.: 16/047,185

(22) Filed: Jul. 27, 2018

(65) Prior Publication Data

US 2020/0036768 A1  Jan. 30, 2020

(51) Int. Cl.
*H04L 29/06* (2006.01)
*H04L 29/08* (2006.01)

(52) U.S. Cl.
CPC .............. *H04L 65/80* (2013.01); *H04L 65/60* (2013.01); *H04L 67/2842* (2013.01)

(58) Field of Classification Search
CPC ... H04L 65/4084; H04L 65/60; H04L 65/602; H04L 65/80; H04L 67/2842
See application file for complete search history.

(56) References Cited

U.S. PATENT DOCUMENTS

| | | | | |
|---|---|---|---|---|
| 8,139,478 | B1* | 3/2012 | Greenberg | H04L 45/02 370/218 |
| 2009/0150825 | A1* | 6/2009 | Yokoyama | G06F 9/451 715/810 |
| 2013/0044801 | A1* | 2/2013 | Cote | H04L 65/607 375/240.01 |
| 2013/0254346 | A1* | 9/2013 | McGowan | H04N 21/6125 709/219 |
| 2016/0134673 | A1* | 5/2016 | MacInnis | H04L 65/60 709/231 |
| 2018/0109587 | A1* | 4/2018 | Spilka | H04L 65/4092 |
| 2018/0241796 | A1* | 8/2018 | Srinivasan | H04L 65/80 |

* cited by examiner

*Primary Examiner* — Gil H. Lee
(74) *Attorney, Agent, or Firm* — Ansari Katiraei LLP; Arman Katiraei; Sadiq Ansari (57) ABSTRACT

A server distributing a stream to a client device may use server-side metrics to detect issues that interrupt or otherwise affect playback of the stream by the client device. The server reproduces the issues experienced by the client device from the server-side metrics without accessing or using client-side metrics. The server-side metrics may include data that may be produced or obtained by the server such as requested stream segment filenames that identify changes in the stream bitrate, and timestamps at which the client device requests different segments. The client-side metrics may include metrics that are produced by the client device, and that directly identify the same client-side issues the server reproduces via the server-side metrics. The server or a distributed platform in which the server operates may dynamically alter the delivery of the stream or perform other remedial actions if the server detects various client-side issues from the server-side metrics.

20 Claims, 8 Drawing Sheets

SERVER-SIDE REPRODUCTION OF CLIENT-SIDE QUALITY-OF-EXPERIENCE

BACKGROUND ART

Client-side quality-of-experience ("QoE") for media streaming may be based on the quality, speed, and seamlessness with which a requested stream (e.g., video, audio, text, etc.) is rendered or is played back on the requesting client device. The number of times the client device halts playback of the stream in order to refill a stream buffer, the time spent buffering the stream, and the number of times the client device switches between different bitrates of a stream are examples of some issues that may impact the client-side QoE.

The client-side QoE issues may be caused by a variety of factors. For instance, the client device may request and receive the stream from a content delivery network ("CDN"). QoE issues can manifest from the CDN becoming overloaded, becoming unresponsive, suffering a failure, and/or experiencing other degraded performance. The client-side QoE issues can also manifest from congestion, failures, and/or other performance issues occurring on the routers, circuits, network hops, and network paths that form the Internet or other packet-switched network used to distribute the stream from the CDN to the client device.

More generally, client-side QoE issues can manifest anywhere from the creation of the stream (e.g., encoding and/or uploading of the stream to the CDN for redistribution) to the final playback of the stream where performance issues impacting the client device or player application may impact the client-side QoE. Accordingly, a direct and accurate way to detect the client-side QoE issues is from client-side metrics, or metrics that are produced by the client device. Server-side metrics, or metrics produced by the CDN servers distributing the stream to the client device, are less reliable and less accurate than the client-side metrics for detecting client-side QoE issues because the server-side metrics currently do not account for issues that may arise after a CDN server places the stream on the network for delivery to the client device. In other words, server-side metrics do not directly capture or directly identify how a stream is received or played back on a client device.

The client-side metrics are typically generated by the player application that runs on the client device, and that requests, receives, and plays back a stream from the CDN. The provider of the player application is typically an entity that is different than the CDN or stream provider. For instance, the player application provider may provide a single application that a client device can use to playback different streams from different CDNs or stream providers. Consequently, the CDN may not have access to the client-side metrics, or may have to pay to access the client-side metrics. Without the client-side metrics, the CDN may be unable to directly, accurately, or reliably detect and/or correct buffering and/or other issues that affect the client QoE.

DETAILED DESCRIPTION

Systems and methods, as described herein, provide for server-side reproduction of client-side quality-of-experience ("QoE"). The server-side reproduction uses server-side metrics to accurately detect buffering and/or other issues that affect the QoE for a client device requesting, receiving, and playing back a stream and/or other content from a content delivery network ("CDN") or other distributor. More specifically, the server-side reproduction may use a first set of server-side metrics to reproduce the buffering and/or other issues affecting the client-side QoE without accessing or using a different second set of client-side metrics. The first set of server-side metrics may include metrics that are produced by a server distributing a stream or other content to a client device, and the second set of client-side metrics may include metrics that are produced by the client device receiving and/or playing back the stream, and that directly identify the same client-side QoE issues reproduced via the first set of server-side metrics. The first set of server-side metrics may be entered and stored within server logs that are post-processed for the server-side reproduction of client QoE. In some embodiments, the first set of server-side metrics or server logs may be processed as the metrics are generated by the server. The CDN may dynamically alter the delivery of a stream and/or perform other remedial actions for client devices with a poor QoE that the CDN detects based on the server-side reproduction of the client-side QoE.

The server-side metrics for reproducing the client-side QoE may include filenames for different segments of one or more streams that are requested by different client devices, a timestamp associated with each requested segment, and/or other information included with a client device request for a stream segment. Each segment may encode data and/or frames associated with a short duration of a stream. A client device may request and receive the segments of a stream in sequential order in order to playback that stream in a continuous manner.

In some embodiments, the filenames from a sequential set of requests issued by a client device may identify a specific sequence of segments of a particular stream requested by that client device. The filenames may also identify one or more quality levels or bitrates at which each segment of the stream is requested. The timestamp for each segment may identify a time that the segment was requested by a client device, and/or a time that the CDN provides a segment in response to a request for that segment from a client device. The CDN may log the filename for each stream segment that is requested from the CDN by a client device, and may log the timestamp for each segment based on when the segment is requested by a client device or provided by the CDN to a requesting client device.

In some embodiments, the server-side reproduction of the client-side QoE may detect client-side QoE issues (e.g., buffering events, time spent buffering, and/or other issues) affecting playback of a stream by a client device based on the filenames indicating a sequential requesting of stream segments by the client device, a duration of the requested segments indicating a buffered amount of the stream at the client device, and timestamps of the segments requested by the client device indicating a depletion of the stream buffer at the client device. In some embodiments, the server-side reproduction of the client-side QoE may detect client-side QoE issues affecting playback of a stream by a client device based on fluctuations in filenames of segments requested by a client device. The fluctuations may indicate that the quality of the stream is continually changing at the client device, and that the client device is unable to obtain consistent, stable, or high-quality playback of the stream. Other server-side metrics may also be used to detect client-side QoE issues.

In some embodiments, different aggregations of the client-side QoE issues detected for one or more client devices may be used to identify a root cause of the client-side QoE issues. For instance, a first aggregation of detected client-side QoE issues for client devices receiving a stream via a particular network path resulting in an abnormal amount of client-side QoE issues may identify the particular network path as the source of the client-side QoE issues, and a second aggregation of detected client-side QoE issues for client devices receiving a stream from one or more servers of the CDN resulting in an abnormal amount of client-side QoE issues may identify the one or more servers as the source of the client-side QoE issues.

The CDN may detect the client-side QoE issues via a real-time processing of the server-side metrics or a delayed processing of the server-side metrics from server logs. In response to detecting a client-side QoE issue that affects one or more client devices and/or that satisfies or exceeds one or more thresholds, the CDN may take remedial action to improve the QoE for the one or more client devices. The remedial action may reduce or prevent subsequent buffering and/or other QoE issues affecting stream playback at the one or more client devices.

Figure 1:
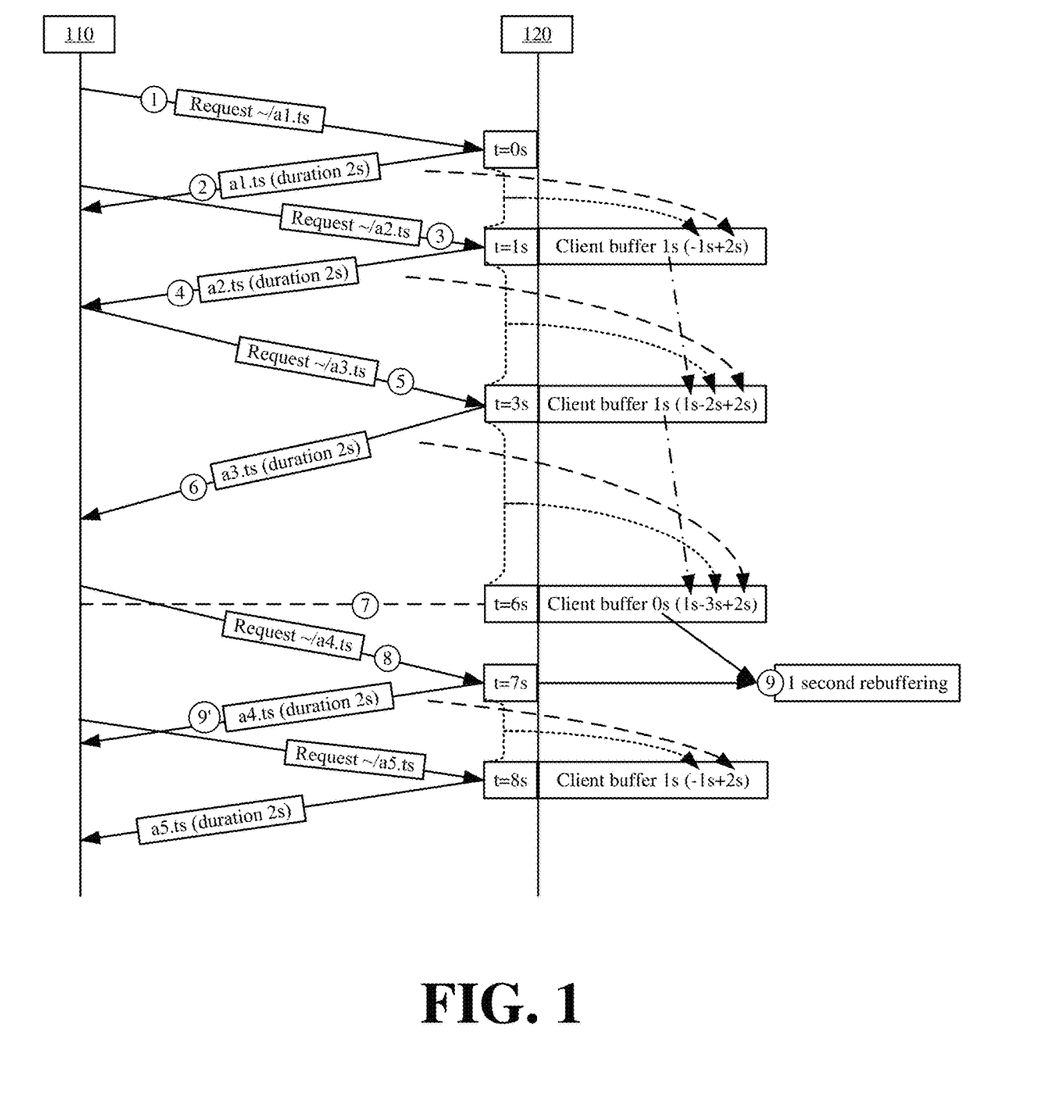
FIG. 1 illustrates an example of a CDN server reproducing client-side QoE in accordance with some embodiments described herein.

FIG. 1 illustrates an example of a CDN server reproducing client-side QoE from server-side metrics in accordance with some embodiments described herein. Specifically, FIG. 1 illustrates the CDN server reproducing the client-side QoE from requested segment filenames, request timestamps, and/or requested segment duration.

The figure illustrates interactions between client device 110 and server 120 of a CDN. Client device 110 may request different segments of a stream from server 120, and server 120 may provide the requested segments in response. Client device 110 may render and/or playback the stream segments provided by server 120 on a screen or display of client device 110 as video or other media content (e.g., audio, text, etc.). In this figure, it is assumed that each segment of the stream encodes a different two second duration of the stream.

Client device 110 may issue (at 1) a first request for a first segment of the stream to server 120 at a first time (e.g., t=0 s). Server 120 may log the filename of the requested first segment and the first time associated with the first request, and may provide (at 2) the first segment to client device 110 in response to the first request.

Client device 110 may issue (at 3) a second request for a second segment of the stream to server 120 at a second time (e.g., t=1 s). In this example, server 120 may receive the second request one second after receiving the first request for the first segment. Server 120 may log the filename of the second segment and the second time associated with the second request, and may provide (at 4) the second segment to client device 110 in response to the second request.

Server 120 may process the log entries to determine, from the logged filenames of the first segment and the second segment, that client device 110 has sequentially requested two or more segments (e.g., the first segment and the second segment) of the stream. Server 120 may also process the timestamps associated with the first segment and the second segment to determine that client device 110 has one second of the first segment buffered at the time (e.g., t=1 s) the second segment is requested. For instance, assuming that the first segment has a two second duration and the second segment is requested one second after the first segment is requested, then client device 110 has one of the two seconds of the first segment buffered or cached when the second request arrives at server 120. Accordingly, client device 110 should not experience any buffering, playback, and/or other QoE issues at the second time.

Client device 110 may issue (at 5) a third request for a third segment of the stream to server 120 at a third time (e.g., t=3 s). In this example, server 120 may receive the third request two seconds after receiving the second request for the second segment. Server 120 may log the filename of the third segment and the third time associated with the third request, and may provide (at 6) the third segment to client device 110 in response to the third request.

Server 120 may process the log entries to determine, from the logged filenames of the second segment and the third segment, that client device 110 continues to request the stream in sequential order. Server 120 may also process the timestamps associated with the second segment and the third segment to determine that client device 110 now has one second of the second segment buffered at the third time (e.g., t=3 s) the third segment is requested. In particular, client device 110 should have played back all of the first segment and one second of the second segment by the third time the third segment is requested. Providing (at 6) the third segment from server 120 to client device 110 provides an additional two seconds of the stream to client device 110, thereby increasing the buffer to three seconds. Again, client device 110 should not experience any buffering, playback, and/or other QoE issues for the first three segments of the stream at the third time.

Server 120 may detect (at 7) a gap that is greater than the three second stream playback buffer or cache at client device 110 (e.g., the client buffer) before the next segment (e.g., the fourth segment) of the stream is requested by client device 110. The gap indicates that the stream playback buffer at client device 110 may have been exhausted. Accordingly, playback of the stream at client device 110 may be halted leading to a QoE issue (e.g., buffering at client device 110).

Server 120 may detect the gap and the QoE issue by tracking the stream playback buffer, or in response to receiving (at 8) a fourth request for the fourth segment at a fourth time, and processing the log entries to determine that the time gap between the third request and the fourth request is greater than the amount of the stream that is buffered or cached by client device 110. Consequently, server 120 may detect that playback of the stream may have been interrupted at client device 110, may record (at 9) the detected client-side QoE issue, and/or provide (at 9') the fourth segment to client device 110. In recording the client-side QoE issue, server 120 may increment a first count for the number of times server 120, via the server-side metrics, detects client device 110 buffering the requested stream, and/or may increment a second count for the total time server 120, via the server-side metrics, detects client device 110 buffering or rebuffering the requested stream. Server 120 may also track a buffer ratio based on the first count and the number of segments requested by client device 110. The buffer ratio may identify the frequency with which client device 110 experiences buffering and/or other QoE issues. In some embodiments, server 120 may track the buffer ratio based on the second count and the total duration of the stream requested by client device 110. In some such embodiments, server 120 may compute the buffer ratio as the time client device 110 spends rebuffering the stream (e.g., total of the second count in seconds) divided by the total duration of the stream (e.g., in seconds).

Server 120 may track and update the first and second counts over one or more sessions where client device 110 requests segments for one or more streams from server 120 and/or other servers of the CDN. The QoE issues detected from the server-side metrics may be stored with or separate from the server-side metrics. In some embodiments, the QoE issues detected by server 120 are shared with other servers of the CDN.

The CDN may take remedial action in response to the QoE issue detected by server 120. Alternatively, the CDN may take remedial action if one or more QoE issues detected for client device 110 and/or other client devices, accessing the same stream, different stream, same server 120, or one or more other CDN servers satisfy one or more thresholds. For instance, if the CDN, via server 120, detects client device 110 experiencing a specific number of buffering events (e.g., five separate rebuffering instances) or buffering for a specific total time (e.g., five or more seconds spent rebuffering) while streaming one or more streams from server 120, the CDN may redirect client device 110 to request the one or more streams from a different server of the CDN, or may provide the requested streams from different CDN servers or over different network paths as some examples of remedial actions that can be taken by the CDN.

Figure 2:
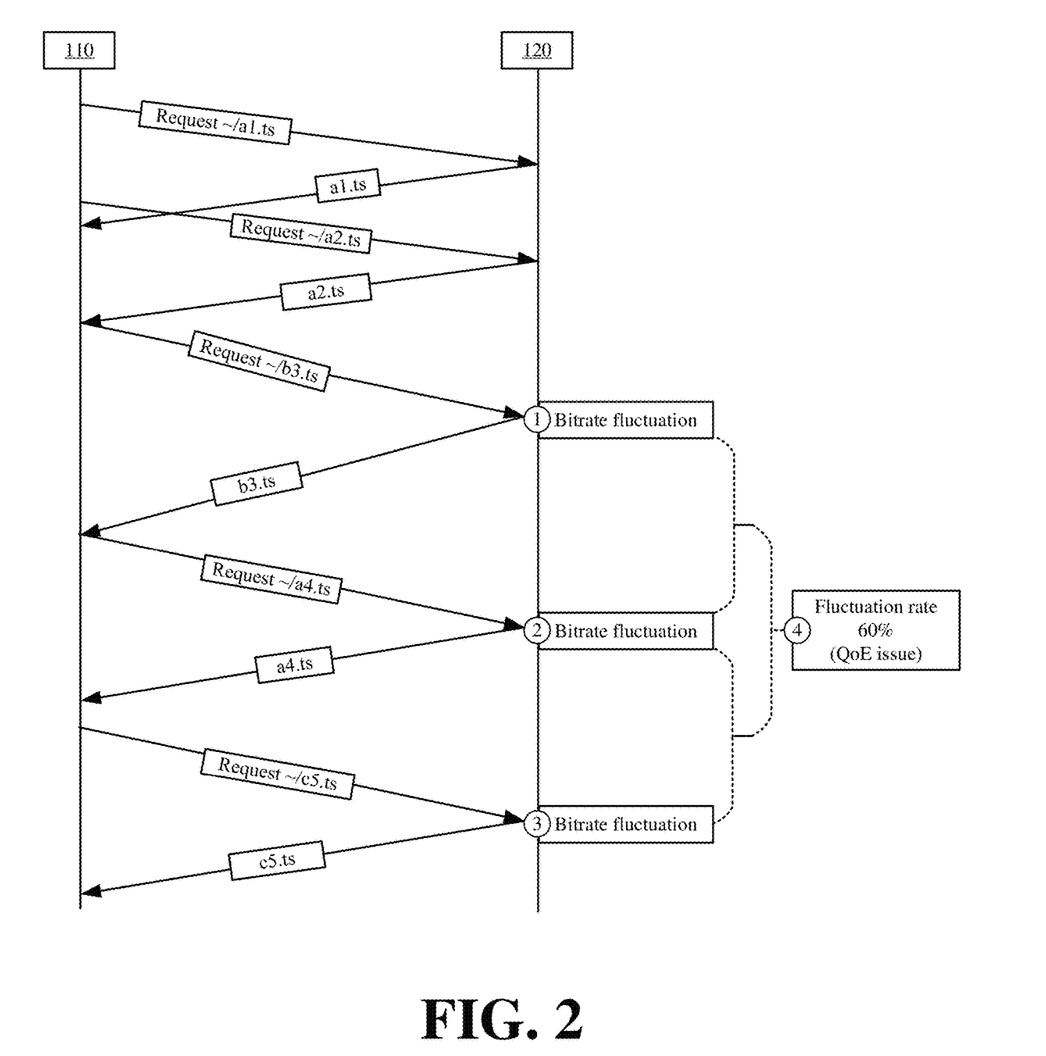
FIG. 2 illustrates an example of a CDN server reproducing client-side QoE based on fluctuations in requested stream segment filenames in accordance with some embodiments described herein.

FIG. 2 illustrates an example of a CDN server reproducing client-side QoE based on fluctuations in requested stream segment filenames in accordance with some embodiments described herein. As shown in FIG. 2, client device 110 sequentially requests segments of the same stream from server 120. Each request specifies the filename for a requested segment. In this figure, the filename identifies the segment that is requested, and also a quality encoding or bitrate for the segment. For instance, the stream may be encoded at a first 250 Kilobits per second ("Kbps") bitrate for delivery of the stream over congested or limited bandwidth networks (e.g., 3G wireless networks), or to client devices 110 with low resolution screens or low processing resources; a second 1.5 Megabits per second ("Mbps") bitrate for a high-definition encoding of the stream for larger screen client devices or high-definition client devices; and a third 10 Mbps ultra high-definition or "4K" stream for client device with very high bandwidth connections. In FIG. 2, a filename starting with the letter "a" indicates the first bitrate, a filename starting with the letter "b" indicates the second bitrate, and a filename starting with the letter "c" indicates the third bitrate. The filename examples also include a number for identifying the particular segment of the stream being requested.

Server 120 may log the filenames of the segments requested by client device 110, and may determine when client device 110 switches bitrates based on changes to the filenames. For instance, server 120 detects (at 1, 2, and 3) client device 110 fluctuating between different bitrates based on changing filenames for three consecutive segments of the stream.

Client device 110 may switch between different bitrate encodings of the stream without there being a QoE issue. Accordingly, when server 120 detects an improvement in quality for the stream requested by client device 110, server 120 may ignore using that fluctuation in determining a client-side QoE issue, and may only detect client-side QoE issues when client device 110 changes to a lower quality encoding or bitrate. In some embodiments, server 120 may detect a QoE issue based on a pattern of fluctuations or a fluctuation frequency or rate. For instance, in FIG. 2, server 120 may detect (at 4) a client-side QoE issue in response to detecting a fluctuation rate that exceeds 50% (e.g., client device 110 switching between different bitrates at least with every other segment request). The total number of fluctuations can also be used to determine a client-side QoE issue using the server-side metrics of fluctuating filenames. Here again, the CDN can perform a corrective action in response to server 120 detecting, via the server-side metrics, a threshold number of bitrate fluctuations by client device 110.

The server-side reproduction of client QoE may be performed for stream segments in which the corresponding segment filenames do not contain the bitrate information or identification. In some such embodiments, server 120 may detect the change in bitrate based on the size of the segments being requested by client device 110. Server 120 may log the size of the requested segments to detect a change in size. An increase in file size may indicate a change to a higher bitrate, and a decrease in file size may indicate a change to a lower bitrate. Segments of the same bitrate should have about equal size when spanning equal durations of the stream (e.g., each segment spans a two second duration of the stream). Server 120 may therefore detect a client-side QoE issue in response to detecting, based on changing segment sizes, a fluctuation rate that exceeds some threshold (e.g., client device 110 frequently switching between different bitrates).

Figure 3:
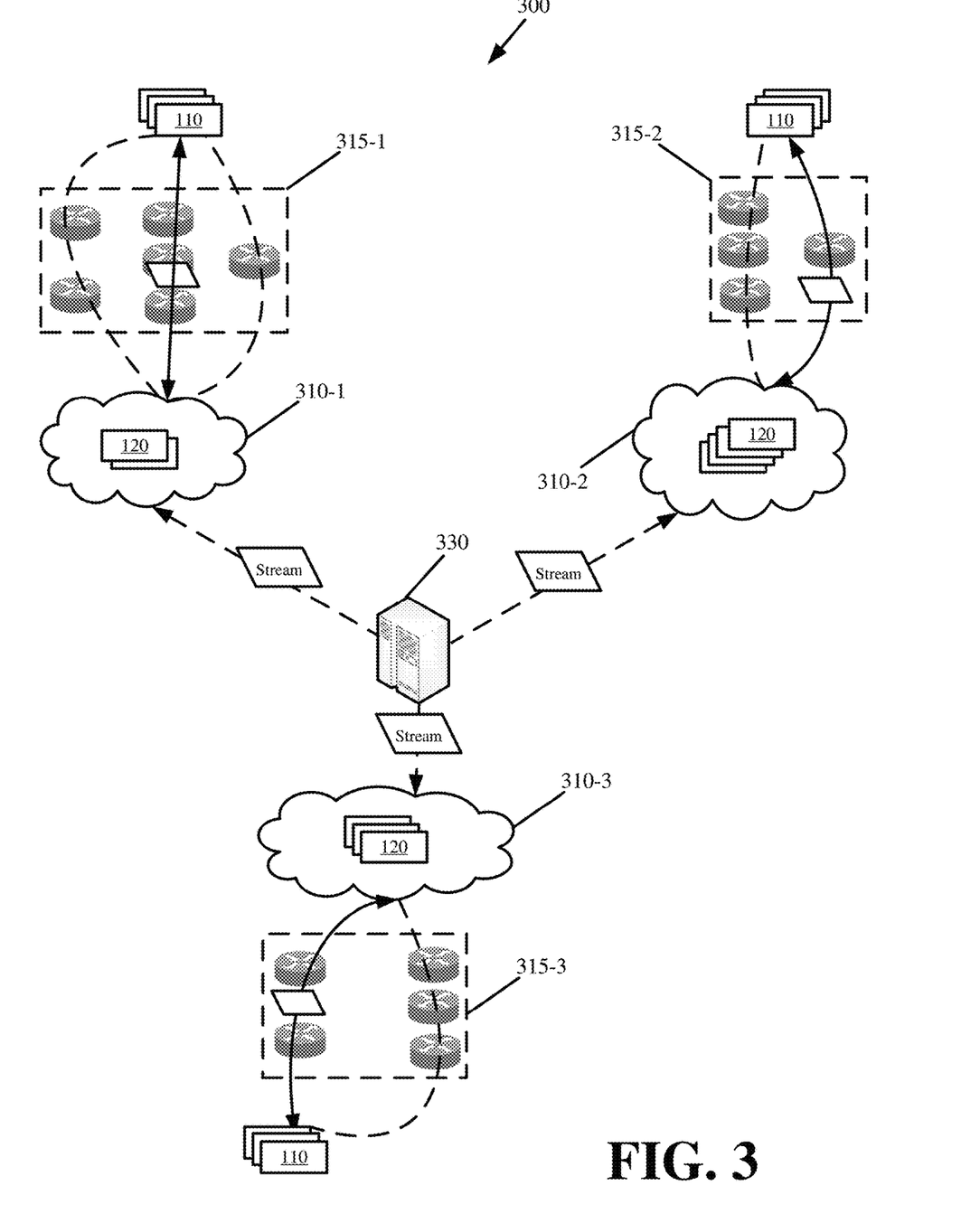
FIG. 3 illustrates an example content delivery network ("CDN") for the server-side reproduction of the client-side QoE in accordance with some embodiments.

FIG. 3 illustrates example CDN 300 for the server-side reproduction of the client-side QoE in accordance with some embodiments. CDN 300 may represent a distributed platform from which one or more streams may be served over the Internet or other packet-switched network to different sets of client devices 110.

CDN 300 may include points-of-presence ("PoPs") 310-1, 310-2, and 310-3 (herein sometimes collectively referred to as "PoPs 310" or individually as "PoP 310"). PoPs 310 may be geographically separated from one another, and may be deployed to different locations within a packet-switched network.

Each PoP 310-1, 310-2, and 310-3 may host, cache, and/or serve the same or different streams and/or content. PoPs 310 may distribute the same streams in order to optimize delivery of the streams to client devices 110 that operate from nearby geographic regions or network locations. For instance, a first set of client devices 110 may be geographically closer to PoP 310-1 than PoPs 310-2 and 310-3. Consequently, PoP 310-1 may provide streams to the first set of client devices 110 via fewer network hops, and consequently less latency, less potential of network failure or network congestion, and overall better performance, than when providing the same streams via more network hops from PoPs 310-2 and 310-3 to the first set of client devices 110.

Client devices 110, and more specifically, requests issued from client devices 110 may be routed to an optimal PoP 310, via Anycast routing or Domain Name System (DNS) routing, based on geographic proximity, network congestion, available resources, and/or other factors. DNS servers and/or routers may therefore determine and select which PoP 310-1, 310-2, or 310-3 is optimal for each client device 110.

Each PoP 310-1, 310-2, and 310-3 may communicate with client devices 110 over a different set of network paths 315-1, 315-2, or 315-3 (herein sometimes collectively referred to as "network paths 315" or individually as "network path 315"). Each network path 315 may involve a different traversal of network hops, routers, circuits, and/or other networking devices for routing messaging between PoPs 310 and client devices 110.

A transit provider typically operates the network hops, routers, circuits, and/or networking devices along network paths 315 controlled by that transit provider. A transit provider may sometimes leverage network hops, routers, circuits, and/or networking devices of other transit providers to complete a path, whereby relationships between the transit providers allow them to pass traffic on one another's network hops, routers, circuits, and/or networking devices. Some transit providers include NTT Communications, Tata Communications, Telefonica, TeliaSonera, and Verizon.

Each network path of the different sets of network paths 315-1, 315-2, and 315-3 may have different performance characteristics at different times due to usage, congestion, failures, and/or other factors. Two or more network paths within a set of network paths 315 available to each PoP 310 provide different options with which each PoP 310 can distribute streams to client devices 110. In other words, each PoP 310 can switch between different network paths 315 when performing a first set of remedial actions for correcting client-side QoE issues that are detected from the server-side metrics and the server-side reproduction of the client-side QoE issues. For instance, PoP 310-1 may transition delivery of a stream segment to client device 110 from a first network path of network paths 315-1 to a second network path of network paths 315-1 when the server-side reproduction of the client-side QoE detects buffering and/or other QoE issues that may be due to congestion or other issues on the first network path.

Each PoP 310-1, 310-2, and 310-3 may include one or more servers 120. Servers 120 can be separate physical machines, or a set of virtual machines running on a partitioned or shared set of resources of one or more physical machines. Servers 120 may include at least a processor, network connectivity, memory, and/or storage. Additional components of servers 120 are described with respect to FIG. 8 below. Servers 120 may also include machine executable instructions for performing the server-side reproduction of the client-side QoE in accordance with some embodiments.

Servers 120 may be streaming devices and/or content distribution devices. Servers 120 may receive and respond to client device 110 requests for streams and/or other content that are offloaded to CDN 300 for delivery. The requests may include HyperText Transfer Protocol ("HTTP") GET messages and request messages of other communication protocols. Servers 120 may support HTTP Live Stream ("HLS"), HTTP Dynamic Streaming ("HDS"), HTTP Smooth Streaming ("HSS"), and/or other streaming protocols for distributing streams to client devices 110. The streams and/or other content may be uploaded and/or cached in memory or storage of one or more servers 120 in one or more PoPs 310. The streams and/or other content may also be uploaded and stored to one or more origin storages 330.

Origin storage 330 may include one or more storage devices for storing streams and/or other content that CDN 300 serves to client devices 110. Origin storage 330 may be operated by CDN 300 or by different customers that rely on CDN 300 for distribution of their streams to client devices 110. If server 120 at any PoP 310-1, 310-2, or 310-3 receives a request from a client device 110 for a stream segment that is not locally cached by server 120, server 120 may be configured to request and retrieve the stream segment from origin storage 330.

Each server 120 may log information about received requests and/or served content to memory or a log file. As noted above, the log may track at least a filename and a timestamp for each received request. The filename may identify a stream segment or other content that is requested, and may additionally identify a particular bitrate encoding for the requested stream segment. The filename may be extracted from a Uniform Resource Locator ("URL") of a request. The timestamp may identify the time at which the request for a specific filename is received, or the time at which the requested stream segment is served to a requestor. For each log entry (e.g., filename and timestamp combination), server 120 may also log an identifier that identifies the requesting client device 110. For instance, each log entry may be associated with one or more of an Internet Protocol ("IP") address, port number, and user agent. This supplemental information may be obtained from a header or URL of the logged request.

Client devices 110 may include any network-enabled device that can communicate with other devices via the Internet or any packet-switched network. In some implementations, client devices 110 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a desktop computer, a laptop computer, a tablet computer, an IoT device, a wearable device, and/or other network-enabled computing device.

The server-side reproduction of client-side QoE by CDN servers 120 using server-side metrics may include reproducing client-side QoE issues on a per stream basis, per client device 110 basis, an aggregate client device 110 basis (e.g., two or more client devices 110), an aggregate stream basis (e.g., two or more streams), and/or other aggregations of the detected client-side QoE issues. In so doing, the CDN can detect client-side QoE issues and isolate the root cause of the detected client-side issues to individual client devices 110, a set of client devices 110 (e.g., a particular device type), individual streams, individual servers 120 of a PoP 310, a specific PoP 310, a specific region, specific network paths, specific bitrates, specific encodings, etc.

Figure 4:
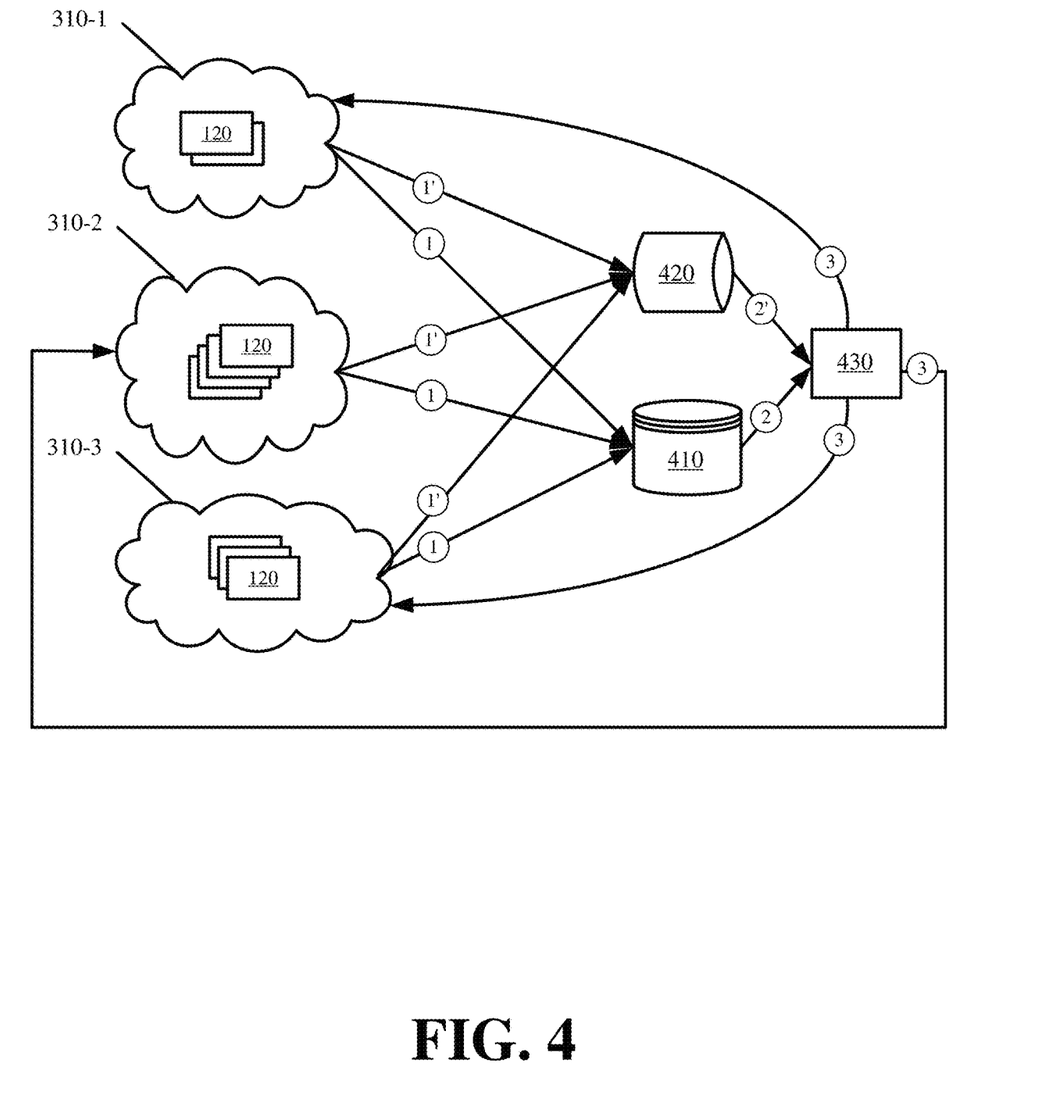
FIG. 4 illustrates example components of a CDN for supporting different aggregations of client-side QoE issues detected via server-side reproduction of the client-side QoE by individual servers from different points-of-presence ("PoPs") of the CDN.

FIG. 4 illustrates example components of CDN 300 for supporting different aggregations of client-side QoE issues that are detected via server-side reproduction of the client-side QoE. In this figure, CDN 300 may include long-term log storage system 410, real-time log retrieval system 420, and log processing system 430 in addition to or instead of one or more of the components illustrated above in FIG. 3.

Long-term log storage system 410 may periodically obtain (at 1) the logs from servers 120 operating in PoPs 310 of CDN 300. For instance, long-term log storage system 410 may obtain (at 1) the logs on an hourly or daily basis. Long-term log storage system 410 may include a filesystem that is used to store a large number of logs (e.g., log files) collected over a long period of time.

Real-time log retrieval system 420 may also collect (at 1') logs from servers 120, but may do so on a real-time basis. For instance, each server 120 may provide (at 1') a log entry to real-time log retrieval system 420 when that entry is created. Alternatively, each server 120 may provide (at 1') a log to real-time log retrieval system 420 once a session or stream associated with the log is complete. Push or pull based mechanisms may be used to transfer the logs from servers 120 to long-term storage system 410 and/or real-time log retrieval system 420.

Log processing system 430 may obtain (at 2 and 2') the server created logs from long-term log storage system 410 and/or real-time log retrieval system 420, and may process the logs individually and/or in different combinations in order to identify and isolate different root causes for detected client-side QoE issues. For instance, log processing system 430 may aggregate different sets of logs with each set of logs corresponding to streams that were provided over the same network path. Log process system 430 may process each of the different sets of logs for each network path to determine if detected client-side QoE issues occur on certain network paths but not other network paths. Similarly, log processing system 430 may aggregate different sets of logs with each set of logs corresponding to logs produced by servers 120 of the same PoP 310. Log process system 430 may process each set of the different sets of logs for each PoP 310 to determine if detected client-side QoE issues occur from certain PoPs 310 but not other PoPs 310. Other log aggregations and processing may be performed by log processing system 430 in order to identify and isolate other root causes for client-side QoE issues experienced by one or more client devices 110.

In response to identifying a root cause for a client-side QoE issue, log processing system 430 may select a corrective action for servers 120 affected by the QoE issue to perform, and may instruct (at 3) those servers 120 to perform the corrective action. Examples of various corrective actions are provided below.

Log processing system 430 may detect client-side QoE issues as they occur by obtaining logs in real-time from real-time log retrieval system 420, and by processing the logs as they are received. Log processing system 430 may also detect patterns or historical client-side QoE issues by obtaining a larger set of logs spanning a longer period of time from long-term log storage 410, and performing a deeper processing of the log data.

Log processing system 430 may also process the historical logs obtained from long-term storage system 430 concurrently with the real-time logs obtained from real-time log retrieval system 420. For instance, log processing system 430 may detect patterns that lead to client-side QoE issues from the processing of the historical logs, and may scan the logs obtained in real-time to look for the patterns, predict a potential client-side QoE issue upon detecting a pattern, and/or preemptively take action to prevent the client-side QoE issue.

In some embodiments, multiple instances of log processing system 430 may be instantiated in order to perform the different aggregations and processing of the logs. The number of instances may coincide with the number of streams that are concurrently served from PoPs 310 to client devices 110 and/or the number of requests that are concurrently received from client devices 110.

In some embodiments, servers 120 may perform the log processing and/or detection of client-side QoE issues in addition to or instead of log processing system 430. Each server 120 may process its own logs to identify QoE issues affecting streams delivered by that server 120. Additionally, servers 120 in the same or different PoPs 310 may share logs with one another in order to perform the aggregated processing and isolating of different root causes for different QoE issues affecting one or more client devices 110.

Figure 5A:
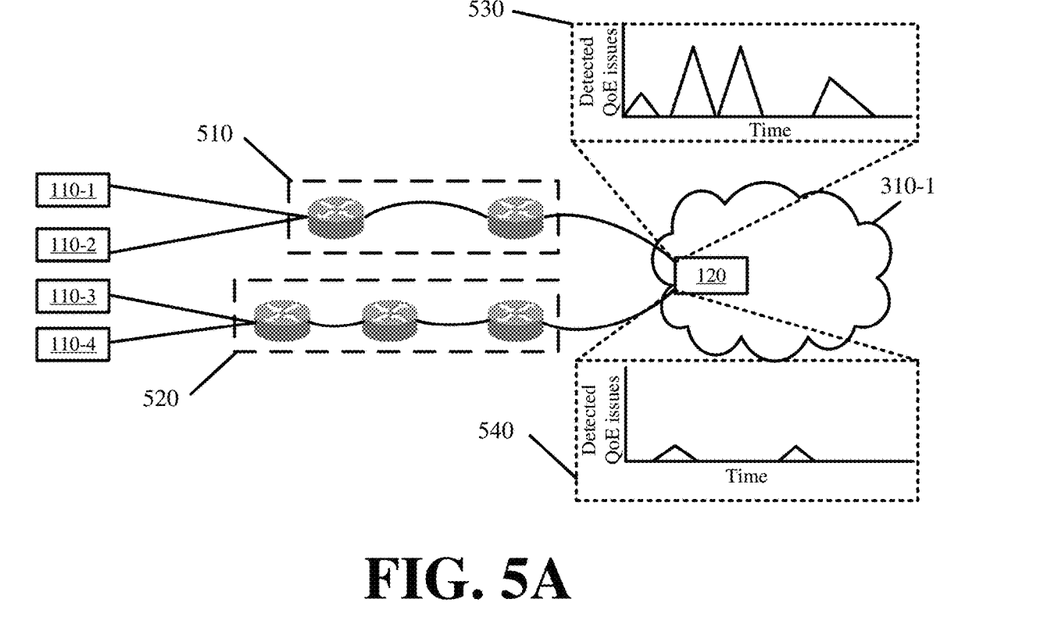
FIGS. 5A and 5B illustrate examples of using the server-side reproduction of client-side QoE to detect and correct client-side QoE issues originating along a particular network path.
Figure 5B:
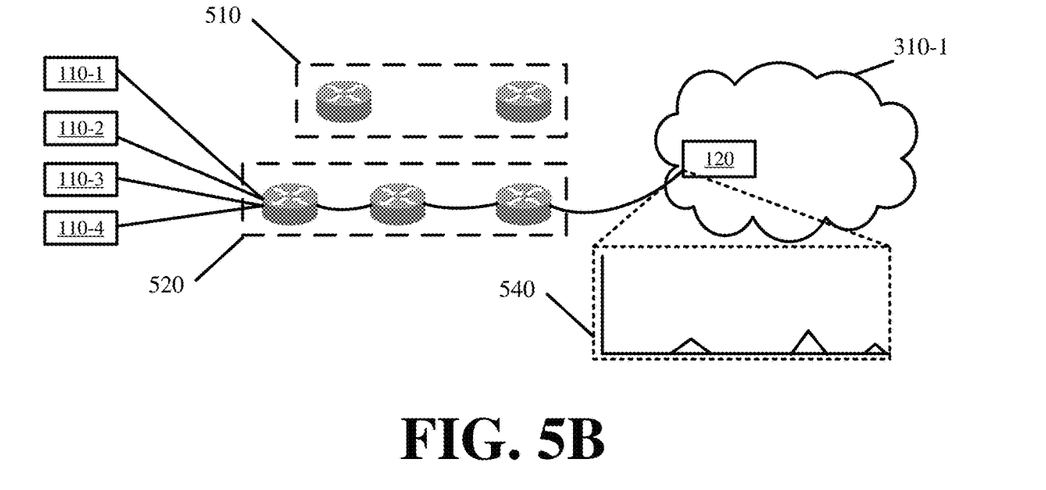

FIGS. 5A and 5B illustrate examples of using the server-side reproduction of client-side QoE to detect and correct client-side QoE issues originating along a particular network path. FIG. 5A illustrates first client device 110-1 and second client device 110-2 requesting and receiving streaming segments from server 120 of PoP 310-1 via first network path 510, and third client device 110-3 and fourth client device 110-4 requesting and receiving streaming segments from server 120 of PoP 310-1 via second network path 520. First network path 510 and second network paths 520 may be network paths from first set of network paths 315-1 with which PoP 310 may access client devices 110-1, 110-2, 110-3, and 110-4.

Server 120 may perform the server-side reproduction of client-side QoE for each client device 110-1, 110-2, 110-3, and 110-4. In doing so, server 120 may detect, from the server-side metrics, one or more buffering and/or other client-side QoE issues associated with the delivery of the stream segments to one or more of client devices 110-1, 110-2, 110-3, and 110-4.

Server 120 may analyze client-side QoE on each network path 510 and 520 by aggregating the server-side reproduction of client side QoE for client devices 110-1 and 110-2 that communicate with server 120 via first network path 510, and by separately aggregating the server-side reproduction of client side QoE for client devices 110-3 and 110-4 that communicate with server 120 via second network path 520. The aggregation may include aggregating the client-side QoE issues detected for client device 110-1 with the client-side QoE issues detected for client device 110-2, and aggregating the client-side QoE issues detected for client device 110-3 with the client-side QoE issues detected for client device 110-4. More specifically, server 120 may produce an aggregate count for the number of buffering events that occur over each network path 510 and 520, the total buffering time occurring over each network path 510 and 520, and/or the buffering ratio occurring over each network path 510 and 520.

Graphs 530 and 540 from FIG. 5A conceptually illustrate the aggregated client-side QoE issues detected for each network path 510 and 520. As shown, client devices 110-1 and 110-2 experience a significantly larger number of client-side QoE issues while receiving the stream over first network path 510 than client devices 110-3 and 110-4 receiving the same stream over second network path 520. Moreover, graph 530 illustrates spikes in which multiple client devices 110-1 and 110-2 may experience QoE issues at the same time. These spikes may occur when there is congestion, a failure, or other temporary issue along first network path 510 that disrupts the flow of traffic between PoP 310 and client devices 110-1 and 110-2 for some amount of time.

The aggregate client-side QoE issues occurring over first network path 510 may satisfy or exceed a threshold. In response to satisfying or exceeding the threshold, server 120, PoP 310, and/or CDN 300 may take corrective action to improve the client-side QoE for client devices 110-1 and 110-2.

FIG. 5B illustrates server 120 taking corrective action based on the aggregated client-side QoE issues detected on each network path 510 and 520 via the server-side reproduced client-side QoE. The corrective action taken by server 120 in FIG. 5B may include server 120 stopping delivery of requested stream segments to client devices 110-1 and 110-2 via first network path 510, and instead delivering the requested stream segments to client devices 110-1 and 110-2 via second network path 520.

Server 120 may continue tracking client-side QoE issues using the server-side metrics after transitioning delivery of the requested stream to second network path 520. For instance, server 120 may perform the server-side reproduction of client-side QoE for each client device 110-1, 110-2, 110-3, and 110-4 receiving the stream via second network path 520, and may aggregate the client-side QoE issues detected for each client device 110-1, 110-2, 110-3, and 110-4 to determine that the client-side QoE for all client devices 110-1, 110-2, 110-3, and 110-4 and the stream has improved as a result of shifting traffic to second network path 520.

Traffic may be shifted to different network paths 510 and 520 by changing routing policies of a gateway router for PoP 310-1. The gateway router may control how traffic exiting PoP 310-1 is routed across network paths 510 and 520. By changing the routing policy, the gateway router may prioritize network path 520 over network path 510 for all traffic, for client devices 110-1, 110-2, 110-3, and 110-4, or for certain streams and/or content. Gateway router may also control which of network paths 510 and 520 client devices 110 may use to communicate with PoP 310-1 by advertising PoP 310-1 availability (e.g., IP addressing) over one or more network paths 510 and/or 520 that client devices 110 may use to communicate with PoP 310-1, or by withdrawing route and/or address advertising from one or more network paths 510 and/or 520 that client devices 110 may not use to communicate with PoP 310-1. For instance, to perform the corrective action illustrated in FIG. 5B, the gateway router for PoP 310-1 may withdraw advertising PoP 310-1 availability over first network path 510. This causes all client devices 110 to request content from PoP 310-1 via second network path 520. Other means by which server 120, PoP 310-1, gateway router of PoP 310-1, and/or CDN 300 may use to control the routing of traffic over different network paths 315 are described in U.S. Pat. No. 10,033,628 entitled "Application Controlled Path Selection Over Different Transit Providers". The contents of U.S. Pat. No. 10,033,628 are incorporated herein by reference.

Figure 6A:
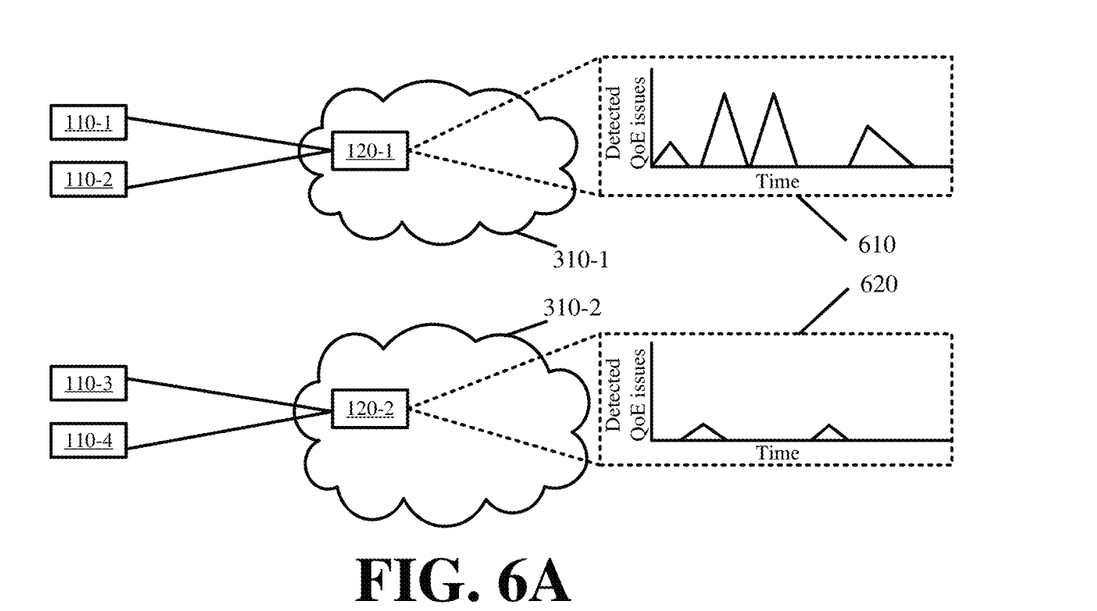
FIGS. 6A and 6B illustrate examples of using the server-side reproduction of client-side QoE to detect and correct client-side QoE issues originating from a CDN PoP.
Figure 6B:
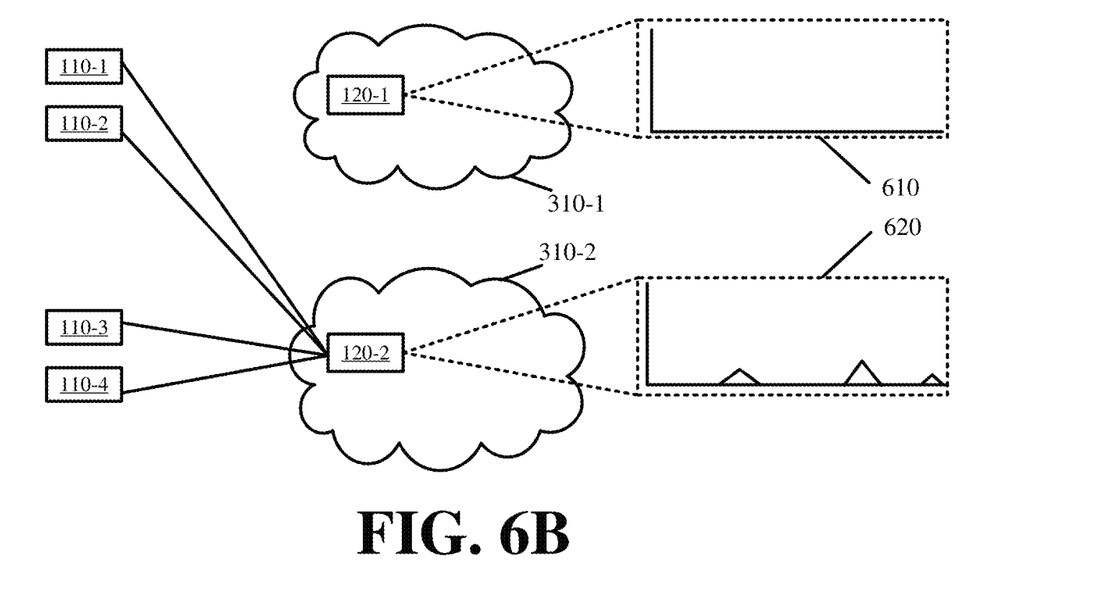

FIGS. 6A and 6B illustrate examples of using the server-side reproduction of client-side QoE to detect and correct client-side QoE issues originating from a CDN PoP. FIG. 6A illustrates first client device 110-1 and second client device 110-2 requesting and receiving streaming segments from server 120-1 of PoP 310-1, and third client device 110-3 and fourth client device 110-4 requesting and receiving streaming segments from server 120-2 of PoP 310-2.

Server 120-1 may perform the server-side reproduction of client-side QoE for client devices 110-1 and 110-2 accessing PoP 310-1, and server 120-2 may perform the server-side reproduction of client-side QoE for client devices 110-3 and 110-4 accessing PoP 310-2. Server 120-1 may aggregate buffering and/or other client-side QoE issues detected for client devices 110-1 and 110-2 in order to produce graph 610, and determine client-side QoE issues that may be caused by resources (e.g., servers) and/or responsiveness of PoP 310-1. Similarly, server 120-2 may aggregate buffering and/or other client-side QoE issues detected for client devices 110-3 and 110-4 in order to produce graph 620, and determine client-side QoE issues that may be caused by resources and/or responsiveness of PoP 310-2. For instance, graph 610 may represent the total number of buffering events, the total buffering time, and/or the buffering ratio experienced by client devices 110-1 and 110-2 over time.

As shown by graphs 610 and 620 of FIG. 6A, client devices 110-1 and 110-2 experience a significantly larger number of client-side QoE issues as a result of receiving the stream from PoP 310-1 than client devices 110-3 and 110-4 receiving the same stream from PoP 310-2. Moreover, graph 610 illustrates spikes in which multiple client devices 110-1 and 110-2 may experience client-side QoE issues at the same time. In this instance, the spikes may occur when PoP 310-1 is overloaded, suffers a failure, or experiences another temporary issue that degrades the responsiveness of server 120-1 and/or other servers operating from PoP 310-1.

The aggregate client-side QoE issues isolated to PoP 310-1, via the server-side reproduction of the client-side QoE, may satisfy or exceed a threshold. In response to satisfying or exceeding the threshold, server 120-1, PoP 310-1, or CDN 300 may take corrective action to preemptively improve the client-side QoE for client devices 110-1 and 110-2.

FIG. 6B illustrates an example of corrective action taken in response to aggregated QoE issues detected on a per PoP basis via the server-side reproduced client-side QoE. The corrective action shown in FIG. 6B may include shifting traffic for the stream impacted by the poor QoE from PoP 310-1 to PoP 310-2. In particular, server 120-2 from PoP 310-2 is shown to provide subsequent segments of the requested stream to client devices 110-1 and 110-2 that previously received segments of the requested stream from server 120-1 operating from PoP 310-1. Server 120-2 may continue to serve the stream to client devices 110-3 and 110-4. Additional servers from PoP 310-2 may also be used to distribute the segments of the requested stream to one or more client devices 110-1, 110-2, 110-3, and 110-4 in order to reduce the load on server 120-2. Server 120-1 may continue to serve other content that is not time sensitive to other client devices.

The corrective action and traffic shifting illustrated in FIG. 6B may occur in response to (i) server 120-1 redirecting client devices 110-1 and 110-2 to PoP 310-2, (ii) a gateway router of PoP 310-1 withdrawing route or address advertisements for accessing the stream from PoP 310-1, (iii) changing network routing policies, (iv) changing DNS configurations (e.g., zone files), and/or (v) other traffic shifting operations. Server 120-2 may track QoE issues experienced by client devices 110-1, 110-2, 110-3, and 110-4 after traffic delivery to these devices has shifted to PoP 310-2. For instance, server 120-2 may perform the server-side reproduction of client-side QoE for each client device 110-1, 110-2, 110-3, and 110-4 receiving the stream from PoP 310-2, and may aggregate the QoE issues detected for each client device 110-1, 110-2, 110-3, and 110-4 to determine that the QoE for all client devices 110-1, 110-2, 110-3, and 110-4 and the stream has improved as a result of shifting traffic to PoP 310-2.

CDN servers 120 and/or log processing system 430 may perform the server-side reproduction of client-side QoE, and may perform different aggregations (e.g., per stream, PoP, network path, client device type, etc.) of client-side QoE issues that are detected based on the server-side reproduction in order to isolate a root cause of the QoE issues, and/or take corrective action against the root cause and improve QoE for any affected client devices 110. In some embodiments, different thresholds may be configured for different aggregations of the detected QoE issues, and for isolating different root causes. For instance, a first per network path aggregation of client-side QoE issues detected by one or more servers 120 in the same or different PoPs 310 may be compared against a first threshold to determine a network path as the source of the client-side QoE issues, a second per PoP aggregation of client-side QoE detected by servers 120 in different PoPs 310 may be compared against a second threshold to determine a PoP 310 as the source of the client-side QoE issues, a different third per Autonomous System ("AS") aggregation may be compared against a third threshold to determine an AS as the source of the QoE issues, and/or a different fourth aggregation may be compared against a fourth threshold to determine a particular client device type (e.g., user agent) as the source of the QoE issues.

In some embodiments, servers 120 and/or log processing system 430 may continuously perform the server-side reproduction of client-side QoE as new entries are logged in order to detect and correct QoE issues in a near real-time manner. In some other embodiments, servers 120 and/or log processing system 430 may periodically (e.g., every one thousand requests or every five minutes) perform the server-side reproduction of client-side QoE for new logged entries in order to detect and correct QoE issues that have occurred in the prior interval, or that can now be detected based on the entries that were added to the log over the prior interval.

Figure 7:
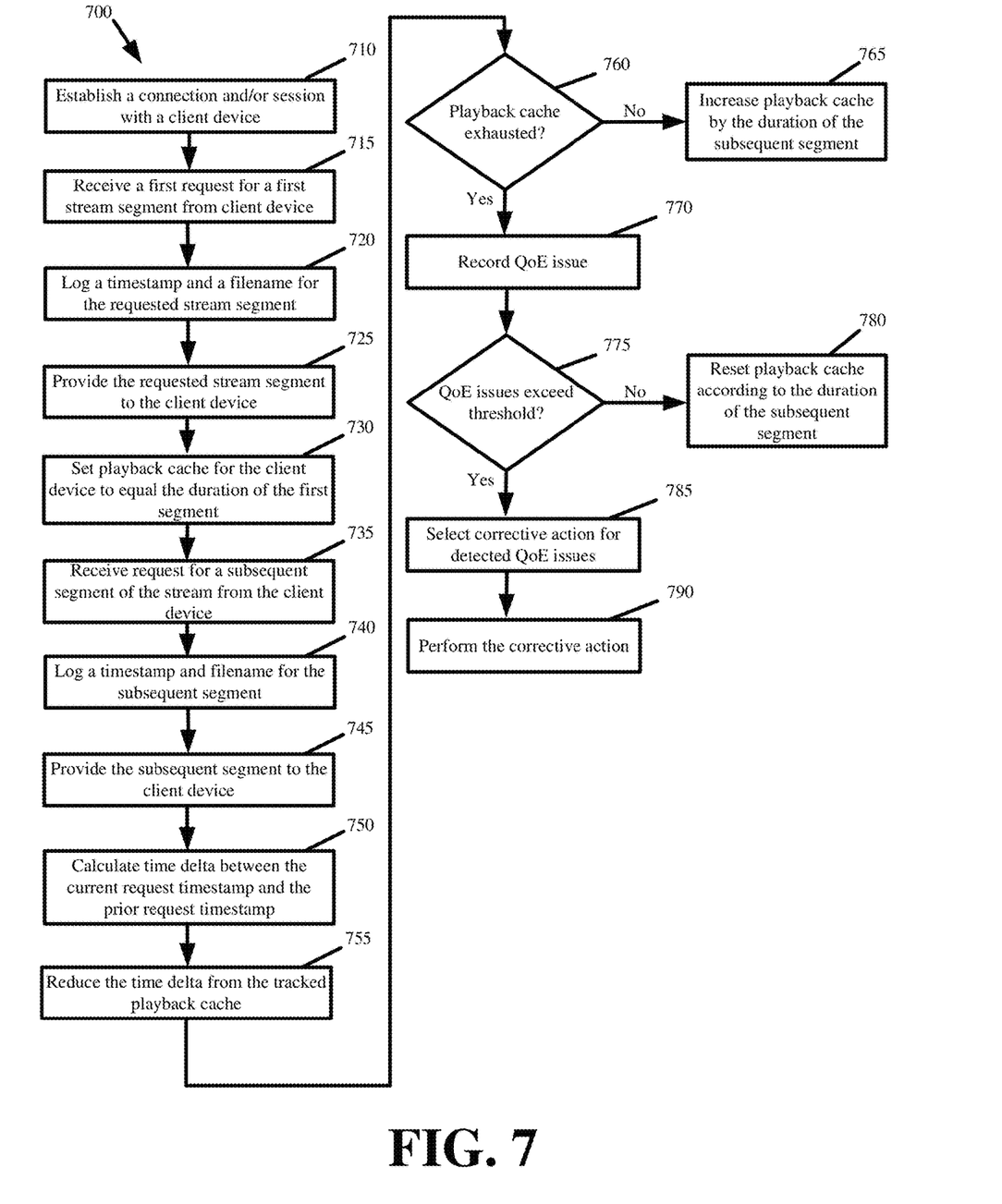
FIG. 7 presents a process for the server-side reproduction of client-side QoE in accordance with some embodiments.

FIG. 7 presents process 700 for the server-side reproduction of client-side QoE in accordance with some embodiments. Process 700 may be performed by one or more servers 120 of CDN 300.

Process 700 may include establishing (at 710) a connection and/or session with client device 110, and receiving (at 715) a first request for a first stream segment from client device 110.

In response to receiving (at 715) the request, process 700 may include logging (at 720) a timestamp for when the request was received, and a filename of the stream segment that is requested in conjunction with the timestamp. The filename may be extracted from a URL accompanying the request. In some embodiments, additional information from the request may be logged. For instance, the user agent, IP address, requested segment size, segment duration, and/or other information identifying the requesting client device may be logged.

Process 700 may include providing (at 725) the requested stream segment to client device 110. Server 120 may obtain the requested stream segment from a local cache if present therein, or may retrieve the requested stream segment from origin storage 330, another PoP 310, or directly from a host device of the stream provider.

Process 700 may detect client-side QoE issues via a playback buffer or cache that tracks the amount of the requested stream that is cached by client device 110 using the logged server-side metrics. Based on the server-side metrics logged (at 720) from the first stream segment requested by client device 110, process 700 may include setting (at 730) the playback cache to equal the duration of the first segment. For instance, if the requested segment has a duration of four seconds, server 120 will set the playback cache tracked for client device 110 to four seconds. The tracked playback cache for client device 110 may be a value that is retained in memory of server 120, or may be a value that is computed from the log entries.

Process 700 may include receiving (at 735) a request for a subsequent segment of the stream from client device 110 via the established connection and/or session, logging (at 740) the timestamp and filename of the subsequent segment, and providing (at 745) the subsequent segment to client device 110 in response to the request. In some embodiments, server 120 may determine that the request is a subsequent segment for the stream that was previously requested by client device 110 based on one or more of a source IP address, port number, and user agent identifying client device 110, and the requested filename identifying the same stream and incrementing a count for the segment that is requested. In some other embodiments, server 120 may determine that the request is a subsequent segment for the stream that was previously requested by client device 110 based on a session identifier that is provided as part of the request, and that uniquely identifies client device 110 or the stream being requested by client device 110.

Process 700 may include calculating (at 750) a time delta between the current request timestamp and the prior request timestamp, reducing (at 755) the time delta from the tracked playback cache for the particular stream being requested by client device 110, and determining (at 760) if the tracked playback cache for client device 110 has been exhausted (e.g., is zero or a negative value).

In response to determining (at 760—No) that the tracked playback cache for client device 110 has not been exhausted, process 700 may include increasing (at 765) the tracked playback cache for client device 110 by the duration of the provided (at 745) subsequent segment. Process 700 may continue by reverting to 735 in response to client device 110 requesting additional segments of the stream in sequential order. Process 700 may end and/or restart in response to client device 110 requesting segments of the stream out of order (e.g., fast-forwarding or skipping to a different part of the stream), and/or ending stream playback by not requesting additional segments of the stream.

In response to determining (at 760—Yes) that the tracked playback cache for client device 110 has been exhausted, process 700 may include recording (at 770) a client-side QoE issue in conjunction with the playback of the stream by client device 110. Recording the client-side QoE issue may include incrementing a count for the number of times client device 110 experiences a buffering event (e.g., rebuffering of the stream) during playback of the stream, increasing a total time playback of the stream is interrupted at client device 110 as a result of client device 110 having to rebuffer the stream for at least the amount of time the playback cache has been exhausted, and/or updating other metrics used to track client-side QoE issues experienced by client device 110. Process 700 may include determining (at 775) if the client-side QoE issues recorded for client device 110 satisfy or exceed one or more thresholds. Process 700 may use the client-side QoE issues detected from client device 110 requesting the stream alone or in aggregate with other client-side QoE issues detected for other streams, other client devices 110, different network paths 315, different PoPs 310, etc. in order to detect root causes for the QoE issues via different thresholds associated with the different root causes.

In response to determining (at 775—No) that the QoE issues do not satisfy or exceed the one or more thresholds, process 700 may include resetting (at 780) the playback cache for client device 110 according to the duration of the provided (at 745) segment. Process 700 may continue by reverting to 735 in response to client device 110 requesting additional segments of the stream in sequential order. Process 700 may end and/or restart in response to client device 110 requesting segments of the stream out of order, and/or ending stream playback by not requesting additional segments of the stream.

In response to determining (at 775—Yes) that the QoE issues do satisfy or exceed the one or more thresholds, process 700 may include selecting (at 785) a corrective action that resolves the detected QoE issues, and performing (at 790) the corrective action. The corrective action can include shifting traffic to one or more different network paths 315, servers 120, PoPs 320, and/or stream encodings (e.g., bitrates) as some examples.

Server, device, and machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
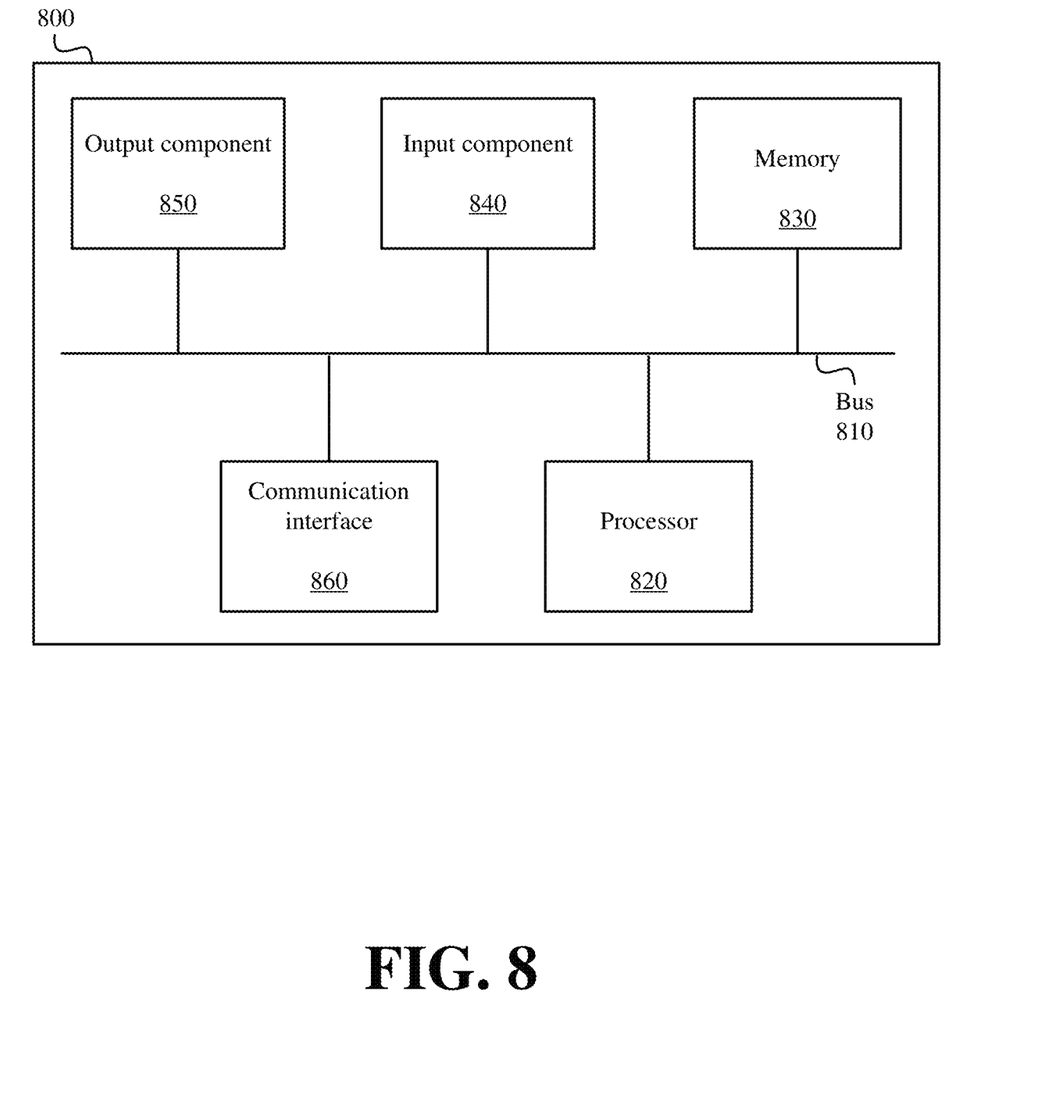
FIG. 8 illustrates example components of one or more devices, according to one or more embodiments described herein.

FIG. 8 is a diagram of example components of device 800. Device 800 may be used to implement certain of the devices described above (e.g., servers 120, client devices 110, origin storage 130, and log process system 430). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of nonvolatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    obtaining a timestamp and a filename from each request of a set of requests received from a client device, wherein the client device sequentially requests two or more segments of a stream;
    calculating an amount of the stream that is buffered by the client device based on the timestamp and the filename of the set of requests, and based on a duration of each of the two or more segments;

incrementing an issue count, that tracks a cumulative number of issues affecting playback of the stream at the client device, based on a difference between the timestamps of the two or more segments being greater than the duration of the two or more segments; and modifying distribution of the stream to the client based on a ratio, that is derived from the issue count and a number of segments requested by the client device, satisfying a threshold, wherein modifying the distribution comprises providing the stream with a different bitrate, from a different server device, or from a different network path.

2. The method of claim 1 further comprising changing distribution of the stream to the client device in response to the difference between the timestamps of the two or more segments being greater than the duration of the two or more segments.

3. The method of claim 1 further comprising providing the two or more segments to the client device via a first network path, and wherein said modifying comprises shifting delivery of subsequent segments of the stream from the first network path to a different second network path.

4. The method of claim 1 further comprising providing the two or more segments to the client device from a first point-of-presence ("PoP") of a distributed platform, and wherein said modifying comprises shifting delivery of subsequent segments of the stream from the first PoP to a different second PoP of the distributed platform, wherein the first PoP comprises a first set of servers of the distributed platform that are deployed to a first network location, and wherein the second PoP comprises a second set of servers of the distributed platform that are deployed to a second network location.

5. The method of claim 1, wherein the issue count tracks a number of times the difference between the timestamps of two or more segments is greater than the duration of the two or more segments during distribution of the stream to the client device.

6. The method of claim 1 further comprising providing a segment of the stream to the client device in response to a request of the set of requests.

7. The method of claim 1 further comprising storing the time and the filename from the set of requests to a log.

8. The method of claim 1 further comprising updating the amount of the stream that is buffered by the client device in response to receiving a request for a next segment of the stream from the client device.

9. A method comprising:
obtaining a timestamp and a filename from each request of a set of requests issued by a plurality of client devices that sequentially request two or more segments of a stream from one or more servers of a distributed platform;
detecting different sets of issues impacting client-side playback of the stream at the plurality of client devices based on a difference between the timestamp from each request of the set of requests and a duration associated with each segment of the two or more segments;
aggregating the different sets of issues impacting the client-side playback of the stream at the plurality of client devices;
determining a root cause, that produces the different sets of issues experienced by each client device of the plurality of client devices, from said aggregating;
determining a ratio or frequency, that is derived from the different sets of issues and the set of requests, exceeds a threshold; and
changing distribution of the stream from the one or more servers to the plurality of clients in response to determining the root cause and the ratio or frequency exceeding the threshold.

10. The method of claim 9, wherein determining the root cause comprises identifying two or more of the different sets of issues, that impact two or more of the plurality of client devices, occurring along a first network path through which segments of the stream are passed from the one or more servers to the plurality of client devices, and wherein changing distribution of the stream comprises halting distribution of the segments of the stream through the first network path, and continuing distribution of the segments of the stream to the plurality of client devices through a different second network path.

11. The method of claim 9, wherein determining the root cause comprises identifying two or more of the different sets of issues, that impact two or more of the plurality of client devices, originating from a first server of the one or more servers, and wherein changing distribution of the stream comprises shifting distribution of the stream from the first server to a different second server of the one or more servers.

12. The method of claim 9 further comprising recording a first issue impacting client-side playback of the stream at a particular client device of the plurality of client devices in response to a gap in the timestamp for a first segment and a second segment requested by the particular client device exceeding a duration of at least the first segment.

13. The method of claim 9, wherein determining the root cause comprises identifying a particular network path as the root cause based on the different sets of issues that are aggregated comprising a threshold number of the plurality of client devices receiving the stream from the one or more servers via the particular network path.

14. The method of claim 9, wherein determining the root cause comprises identifying a subset of the one or more servers as the root cause based on the different sets of issues that are aggregated comprising a threshold number of the plurality of client devices receiving the stream from the subset of servers.

15. A method comprising:
receiving a plurality of requests for different segments of one or more streams from a plurality of client devices at one or more servers;
tracking server-side metrics for the plurality of requests, the server-side metrics comprising data that the one or more servers obtain from the plurality of requests, and data that is independent of client-side metrics produced by the plurality of client devices;
reproducing playback interruptions experienced by the plurality of client devices from the server-side metrics, wherein said reproducing comprises correlating the server-side metrics to stream playback interruptions experienced by the plurality of client devices;
determining a playback interruption frequency based on a proportion of (i) a cumulative number of the playback interruptions experienced by the plurality of client devices to (ii) a cumulative number of segments requested by the plurality of client devices; and
altering distribution of the one or more streams to the plurality of client devices in response to the playback interruption frequency exceeding a threshold, wherein altering the distribution comprises providing the one or more streams with a different bitrate, from a different server device, or from a different network path.

16. The method of claim 15, wherein the server-side metrics comprise timestamps corresponding to times at which each request of the plurality of requests is received by the one or more servers.

17. The method of claim 16 further comprising detecting a playback interruption based on a first time between the timestamps for sequentially requested segments of a stream by a particular client device being greater than a duration of at least one of the sequentially requested segments.

18. The method of claim 15, wherein the server-side metrics comprise filenames identifying different bitrates at which each segment of the one or more streams is requested.

19. The method of claim 18 further comprising detecting a playback interruption based on a first time between the timestamps for sequentially requested segments of a stream by a particular client device being greater than a duration of at least one of the sequentially requested segments.

20. The method of claim 15, wherein the cumulative number of the playback interruptions corresponds to a cumulative number of times the one or more client devices rebuffer the one or more streams or a total rebuffering time.

* * * * *